United States Patent [19]

Geyling et al.

[11] 4,374,161
[45] Feb. 15, 1983

[54] PRESSURE COATING OF FIBERS

[75] Inventors: Franz T. Geyling, Morristown; Theodore J. Louzon, Bridgewater, both of N.J.

[73] Assignee: Bell Telephone Laboratories, Incorporated, Murray Hill, N.J.

[21] Appl. No.: 257,354

[22] Filed: Apr. 24, 1981

[51] Int. Cl.³ .......................... B05D 1/18; B05D 7/20; G02B 1/10; G02B 5/14

[52] U.S. Cl. .................................. 427/160; 427/163; 427/407.1; 427/407.2; 427/434.7

[58] Field of Search ...................... 427/160, 163, 407.1, 427/407.2, 434.7

[56] References Cited

U.S. PATENT DOCUMENTS

| | | |
|---|---|---|
| T963,002 | 10/1977 | Albarino et al. |
| 1,454,224 | 5/1923 | Schmidt |
| 3,837,824 | 9/1974 | Siegmund ............................ 264/1 X |
| 3,960,530 | 6/1976 | Iyengar ............................ 427/169 X |
| 4,073,974 | 2/1978 | Albarino et al. ..................... 427/163 |
| 4,116,654 | 9/1978 | Trehu ............................. 427/163 X |
| 4,246,299 | 1/1981 | Ohls ................................. 427/163 X |

OTHER PUBLICATIONS

Eichenbaum, "Solution Application of Thick EVA Coatings onto Optical Fibers", Bell Telephone Labs Technical Memorandum 74-4542, (1974).

*Primary Examiner*—James R. Hoffman
*Attorney, Agent, or Firm*—James H. Fox

[57] ABSTRACT

Fibers, including optical fibers, are coated under pressure to reduce the amount of bubbles entrapped in the coating. Fluid coating material is directed radially toward the fiber, typically through a porous material or radial channels in a coating applicator. The passage diameter for the fiber is large enough to prevent contacting the fiber, while the pressure of the fluid coating material is high enough to substantially prevent air from entering the applicator. Fiber coating speeds up to at least several meters/second are possible.

6 Claims, 4 Drawing Figures

PRESSURE COATING OF FIBERS

BACKGROUND OF THE INVENTION

1. Field of the Invention

This invention relates to the coating of fibers.

2. Description of the Prior Art

The production of optical fiber usually involves applying one or more coatings to a bare optical fiber. Most optical fibers comprising silica are drawn at high temperature from a preform. One method of preform production is the modified chemical vapor deposition (MCVD) process, as described in U.S. Pat. No. 4,217,027, coassigned with the present invention. Other methods of preform production are also utilized. As the fiber is drawn from the preform, it is typically coated with at least one layer of material. In a dual layer-coated fiber, a first layer typically comprises a relatively soft material, including for example, a silicone or a hot melt wax material for reduced microbending losses. A second layer deposited thereon typically comprises an ultraviolet-cured or thermally cured polymeric material for high strength and abrasion resistance. Other materials and coating combinations are possible. Current draw speeds typically run approximately 1 meter/second, but for economical optical fiber production, it is desired to obtain even higher drawing speeds.

On-line coating of optical fibers is usually done with open cut applicators. Typical devices consist of glass or metal containers, sometimes of a split configuration to avoid a threading problem, wherein the fiber enters the liquid reservoir through the free surface at the top and exits through a rigid or flexible orifice at the bottom. One typical coating apparatus is described in U.S. Defensive Publication No. T963002, coassigned with the present application. However, in such open cup applicators, the wetting of the glass surface depends on conditions at the entering meniscus, the viscosity of the coating medium, and on the static head available in the reservoir. Concentricity and surface quality of the coating are largely dependent on flow in the exit nozzle. At higher drawing speeds, typically above about 2 or 3 meters/second, it has been found that bubble entrapment and incomplete wetting degrade the coating quality. In addition, the centering of the fiber in the exit nozzle is due only to rather weak forces in the case of a convergent nozzle geometry, producing rather poor centering of the fiber in the nozzle.

In other coating fields, for example plastic coating for insulation on copper wire, the copper wire is drawn through a close-fitting die into a coating chamber, wherein the polymer coating is applied at high speeds and high pressures. However, in the case of optical fibers, care must be taken to avoid contact of the bare fiber with the coating apparatus. Therefore, a very close-fitting entrance to the coating chamber is not possible, and other means must be found to obtain high quality, high speed coating of optical fibers.

SUMMARY OF THE INVENTION

We have invented a method and apparatus for coating fibers. In this method, a fiber is pulled through a passage in a coating chamber. Coating fluid is directed under pressure radially inward toward the fiber. The pressure is maintained sufficiently high to substantially prevent air from entering the passage as the fiber is pulled therethrough. The diameter of the passage is sufficiently large to prevent contact of the fiber with the sides of the passage. In typical embodiments, the radial flow of coating fluid is obtained by means of a porous member or a member having radial channels.

DETAILED DESCRIPTION

Figure 1:
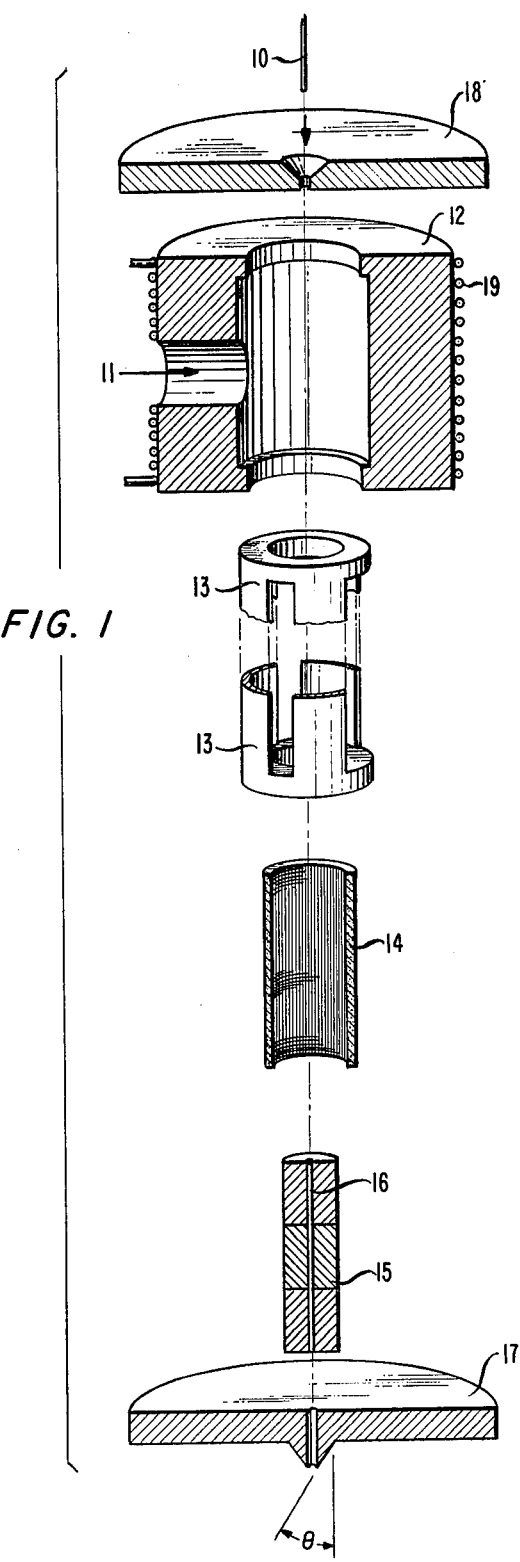
FIG. 1 shows a coating chamber comprising an outer plenum and an outer baffle shell, and an inner porous member.

The following detailed description relates to a method of coating fibers. It is advantageously applied to the production of optical fibers. However, it also applies to other fibers where good coating quality is desired, while avoiding substantial contact of the fiber with the coating applicator during the coating process. Such other fibers include high strength, nonoptical glass, carbon, boron, or Kevlar (trademark of E. I. Dupont), among others. As used herein, the term "optical fiber" means a fiber having an attenuation of less than 10 decibels per kilometer for at least one radiation wavelength in the visible or infrared portion of the electromagnetic spectrum directed axially through the fiber. Typical optical fiber material includes silica as noted above, typically doped with phosphorus, germanium, boron, fluorine, or other materials as desired. The coating of an optical fiber can also serve an optical transmission function, as with polymeric cladding material on a core comprising silica, as is known in the art. Plastic core fibers are also known in the art for optical transmission.

The above-noted problems of wetting and uniformity during the coating of a fiber are largely effected by the behavior of the entrance meniscus which exists in any coating device. As is well known, the wetting characteristics of two materials such as coating resin on glass depend on surface tension and chemical bonds developed between the two materials, which in turn affect the contact angle. Under quasistatic conditions, the transport mechanism by which the equilibrium configuration of the triple point (solid, liquid, gas) establishes itself consists of surface diffusion of the liquid on the solid surface. Under dynamic conditions, when the solid surface is in steady motion relative to the liquid, shear stresses at the solid-liquid interface and fluid inertia behind the meniscus interfere with surface diffusion. Thus, in any coating applicator, the entrance meniscus is drawn down with the moving fiber, instead of rising along its surface as it does under static conditions. With increasing fiber speed, the meniscus extends downwards and develops essentially into a long, thin column of air which surrounds the fiber and is confined in surface tension in the coating liquid. This may occur intermittently, referred to as "meniscus collapse", which results in uneven coating of the fiber and the entrapment of air bubbles in the fiber coating.

In the present invention, a closed, pressurized applicator is utilized whereby the length of the meniscus is minimized by reducing the entrance of the applicator to a pinhole. The meniscus is prevented from extending substantially below the entrance due to lateral pressure from the fluid. However, the diameter of the passage is large enough to substantially prevent contact of the fiber with the sides of the passage. A passage diameter of from about 1.5 to 5 times the diameter of the fiber typically meets these requirements. The resulting coating tends to be very uniform in thickness and of smooth surface quality. To minimize any irregularities that might arise from the exit flow resulting from residual spillage lapping at the fresh coating, a short, rigid, conical nozzle, typically about 20 to 60 degrees, and preferably about 45 degrees half angle, is utilized at the exit. Centering of the fiber is assisted by the radially convergent flow of coating fluid into the fiber passage. The fluid issuing radially inward forms a highly sheared boundary layer which develops pressure gradients characteristic of "lubrication flow". For non-Newtonian coating materials, which most polymers are, visco-elastic stresses in the fluid, as it converges in the passage, contribute significantly to the centering mechanism. For hot melt resins, thermal equilibrium of the closed applicator can be established without much trouble, due to the considerable thermal mass in the pressure-retaining walls of the applicator. A change in the temperature of the applicator has been found to change the fluid characteristics of the coating material, with higher temperatures reducing the effective viscosity of the hot melt resin. This can be conveniently controlled by controlling the temperature of the applicator.

FIG. 1 gives a schematic illustration of one embodiment of the basic concept. The dimensions noted herein are typical examples, with variations in dimensions and arrangement being possible, as will be apparent. Coating fluid is injected under pressure through inlet 11 into the outer plenum of outer shell 12. The temperature of the applicator can be raised, typically for hot melt resins, by a heating element 19 surrounding shell 12. The outer diameter of shell 12 is 2 inches, length 1.5 inches. The outer plenum provides a clearance of about 0.15 inches around outer baffle 13, which allows the fluid to surround the outer baffle. Typical dimensions of the outer baffle are 0.70 inches O.D., 0.02 inches wall thickness, 1.5 inches length. The outer baffle comprises slots therein, typically as shown in FIG. 1, thereby directing the fluid radially inwards with some degree of uniformity. The radial flow is further established by inner baffle 14, 1.3 inches long in the embodiment shown, and made of porous material. Typical material includes five wraps of 200 gauge stainless steel wire mesh, or porous stainless steel as typically made by powder metallurgy, having a typical pore size of 40 microns. The thickness of the wall of this inner baffle is about 0.070 inches in the embodiment shown. This baffle (14) has inner and outer diameters which provide for gaps, typically about 0.020 inches, between this baffle and both outer baffle shell 13 and inner cylinder 15. These gaps help eliminate any non-axisymmetric fluid flow by allowing for circumferential flow in these gaps. The uniformity of coating fluid flow is further improved by an inner cylinder 15, 0.375 inches in diameter, containing an inner bore 16 whose diameter controls the finished coating diameter. The walls of this inner bore are also permeable to the coating liquid which flows radially into the central passage. As the fiber passes along the center line of the bore, the incoming liquid replenishes the shear layer which forms between the moving fiber and the stationary wall. Entrainment of this shear layer produces the coating. The permeable small cylinder 15 in the applicator may consist either of porous material (e.g., partially sintered stainless steel powder) or inserts containing radial passages.

Figure 2:
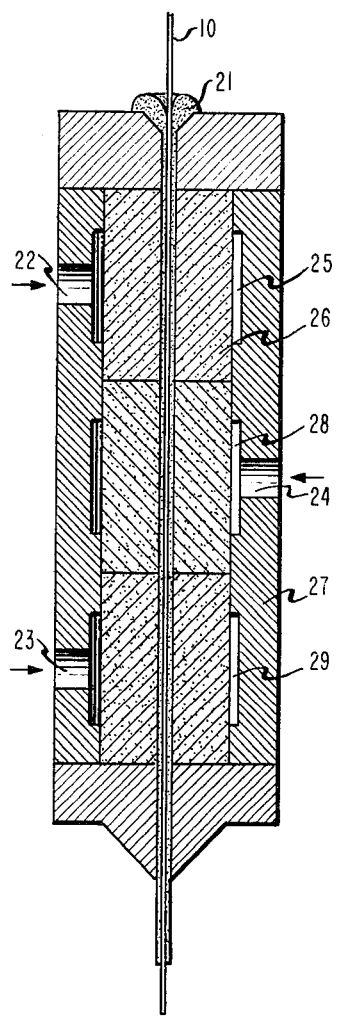
FIG. 2 shows an alternate embodiment utilizing a porous member to obtain radial flow.

In an alternate embodiment shown in FIG. 2, three feed lines apply molten coating fluid from a heated and pressurized reservoir (not shown) to individual plenums around each of the three inserts. The applicator is typically suspended vertically in the draw line, with provision for translation along two orthogonal, horizontal directions, to obtain centering of the fiber in the applicator. Two microscopes mounted orthogonally (not shown) aimed at the exit nozzle assure proper alignment by this suspension.

The above-noted principles will be more fully illustrated by means of the following examples. The fibers used in these Examples are fused silica, approximately 0.005 inches in diameter. The pressures noted herein refer to the pressures at inlet 11 of the applicator. The temperatures herein refer to that of shell 12, which substantially controls the temperature of the coating fluid therein.

EXAMPLE 1

This Example shows the use of a porous applicator, as shown in FIG. 1. The inner cylinder 15 comprises three partially sintered porous stainless steel cylinders (diameter 0.375 inches, length 0.5 inches) stacked end-to-end. The porous cylinders had 100 micron pores, and were formed by sintering compacted 316L stainless steel powder, approximately 20–40 mesh. The compact contained a drill rod, which was removed, producing a central bore 0.015 inches in diameter. The coating resin was National Starch Instaweld trademark 34-3123, having the following properties: viscosity at 175 degrees Celsius, 16,000 centipose (cps); at 190 degrees Celsius, 7,500 cps; at 205 degrees Celsius, 5,000 cps; softening point 110 degrees Celsius; tensile modulus at 25 degrees Celsius, 13,700 psi. Before use, this material was filtered to remove high-density fractions which might otherwise foul the applicator. Operating temperatures for the system from 130 degrees Celsius to 190 degrees Celsius were utilized, with a preferred temperature being approximately 150 degrees Celsius. At 150 degrees Celsius, the preferred pressures at inlet 11 are from about 100 psi at a draw speed of 1 meter/second to about 200 psi at a draw speed of 3 meters/second. A uniform coating having substantially no bubbles entrapped therein was obtained.

Higher temperatures result in lower viscosity of the coating fluid and lower preferred pressures. Too low a pressure results in uneven coating, and too high a pressure results in coating flooding out the top of the applicator. For typical UV-cured or thermally cured polymer coatings, having typical viscosity in the range of 2,000 to 5,000 cps as applied at room temperature, we recommend pressures on the order of 100 psi with the above applicator. A smaller pore size requires a higher pressure to achieve comparable results. Coating fluids having substantially lower viscosity than that noted above typically benefit from the use of an inner cylinder 15 having smaller pores. For example, we recommend coating a fluid having a viscosity of 2 cps with the use of an inner cylinder having approximately 10 micron diameter pores.

EXAMPLE 2

Figure 3:
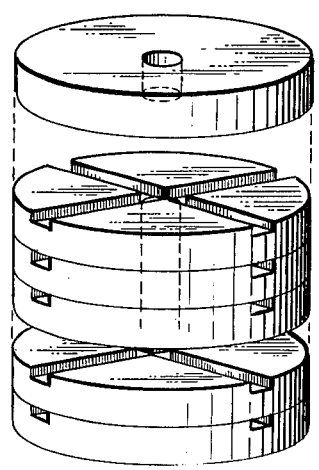
FIG. 3 shows an embodiment of radial channels to obtain a radial flow.

The radial flow coating for this Example was obtained by means of radial channels, as shown in FIG. 3. These channels were formed by stacking 0.03 inch thick discs having crossed, rectangular grooves having dimensions of 0.008 inches by 0.005 inches. Fifty discs were thus utilized as the inner cylinder 15 instead of the porous material, and inserted in the inner baffle shell 14 shown in FIG. 1. The coating material used was the same as in Example 1. At a temperature of approximately 160 degrees Celsius and a pressure of approximately 200 psi, the fiber was coated at a rate of 1 meter/second. The coating quality was very good.

Figure 4:
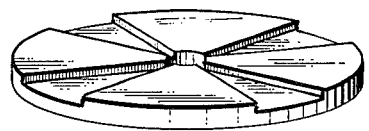
FIG. 4 shows an alternate embodiment employing radial channels.

The use of wedge-shaped grooves as shown in FIG. 4 allows a lower pressure in the outer plenum to achieve a comparable coating rate. We recommend a cross section of about 0.010 inches height by 0.005 inches width at the inner portion of these grooves, and about 0.010 inches by 0.020 inches at the outer perimeter.

When operating according to the inventive method, the pressure in the applicator is adjusted to minimize the occurrence of entrapped air bubbles in the coating. This is typically accomplished by adjusting the pressure so that the meniscus of the coating fluid does not substantially extend into the entrance passage of the coating applicator. Under typical operating conditions, froth due to bubbles entrapped in the coating fluid exits from the top of the applicator. The radial passages provide that the coating fluid impinges on the fiber at a significant velocity, which produces a convergent flow of the coating fluid onto the fiber. This is in contrast to typical open cup applicators, which rely on drag-induced flow to produce a fluid filament at the exit. It is believed that radial momentum transfer from the coating fluid to the fiber, substantially equally on all sides of the fiber, significantly aids in the centering of the fiber in the applicator, while reducing the possibility that air bubbles be drawn into the applicator and hence become entrapped in the coating. We recommend that the substantially radial flow of coating fluid be maintained over a length of fiber of at least 0.5 inches and preferably at least 1.5 inches. We also recommend a coating pressure of at least 50 psi and preferably at least 100 psi for coating fiber at speeds in excess of 1 meter/sec.

Two or more coating layers may be applied by this method. In the case of an optical fiber, the inner layer is typically a relatively soft, compliant material—for example, a hot melt resin—to help reduce microbending losses on the optical fiber, and an outer, harder coating layer is applied to protect the fiber from abrasion and other forms of damage. The present applicator is useful in applying either or both of these coating layers, or still others as may be required. In certain applications, only a single permeable member surrounding the fiber may be necessary to achieve satisfactory radial flow and coating uniformity. In other applications, a greater number of permeable member/plenum combinations than are shown may be desirable. A combination of permeable member types, for example alternating porous members and radial channel members along the axis of the fiber, may be desired to obtain, for example, an optimum of fiber-centering forces and a minimum of air entering the applicator. The radial channels may be tilted to some degree toward the entrance or exit of the central bore for the above-noted reasons. Finally, the radial flow technique, as typically embodied by porous members or radial channels, may be used in conjunction with other types of coating applicators. For example, prior art coating extruders can benefit from the placement of radial flow members at the entrance or exit passages to help center and thus protect the fiber, even though maximum coating effect occurs in some other portions of the apparatus. All such variations and deviations through which the present invention has advanced the art are considered to be within the spirit and scope of the present invention.

What is claimed is:

1. A method of making a coated fiber by steps comprising applying a coating layer to a bare fiber or to an intermediate coated layer thereon, characterized in that said coating layer is applied by directing under pressure a fluid coating material substantially radially inward towards said fiber while said fiber passes through a passage in a chamber, with the substantially radial flow of coating fluid being maintained over a length of the fiber of at least 0.5 inches, wherein said pressure is sufficient to prevent the meniscus of said fluid from substantially extending into said passage, and wherein the diameter of said passage is sufficiently large to substantially prevent said fiber from contacting the sides of said passage.

2. A method according to claim 1 further characterized in that said directing of said fluid coating material is accomplished at least in part by means of a porous material surrounding said fiber.

3. The method of claim 1 further characterized in that said directing of said fluid coating material is accomplished at least in part by means of radial channels surrounding said fiber.

4. The method of claims 2 or 3 further characterized in that said porous material or said radial channels are surrounded by at least one permeable baffle, with said baffle in turn being surrounded by a plenum into which said coating fluid is applied under pressure.

5. The method of claim 1 further characterized in that said fiber is an optical fiber comprising silica, and having an attenuation of less than 10 decibels per kilometer to visible or infrared radiation directed axially therethrough.

6. The method of claim 1 further characterized in that said pressure is at least 100 psi.

* * * * *

UNITED STATES PATENT AND TRADEMARK OFFICE
CERTIFICATE OF CORRECTION

PATENT NO. : 4,374,161

DATED : February 15, 1983

INVENTOR(S) : Franz T. Geyling and Theodore J. Louzon

It is certified that error appears in the above—identified patent and that said Letters Patent is hereby corrected as shown below:

Column 1, line 29, "cut" should be --cup--. Column 2, line 59, "confined in" should be --confined by--.

Signed and Sealed this

Third Day of May 1983

[SEAL]

Attest:

GERALD J. MOSSINGHOFF

Attesting Officer    Commissioner of Patents and Trademarks